UNITED STATES PATENT OFFICE.

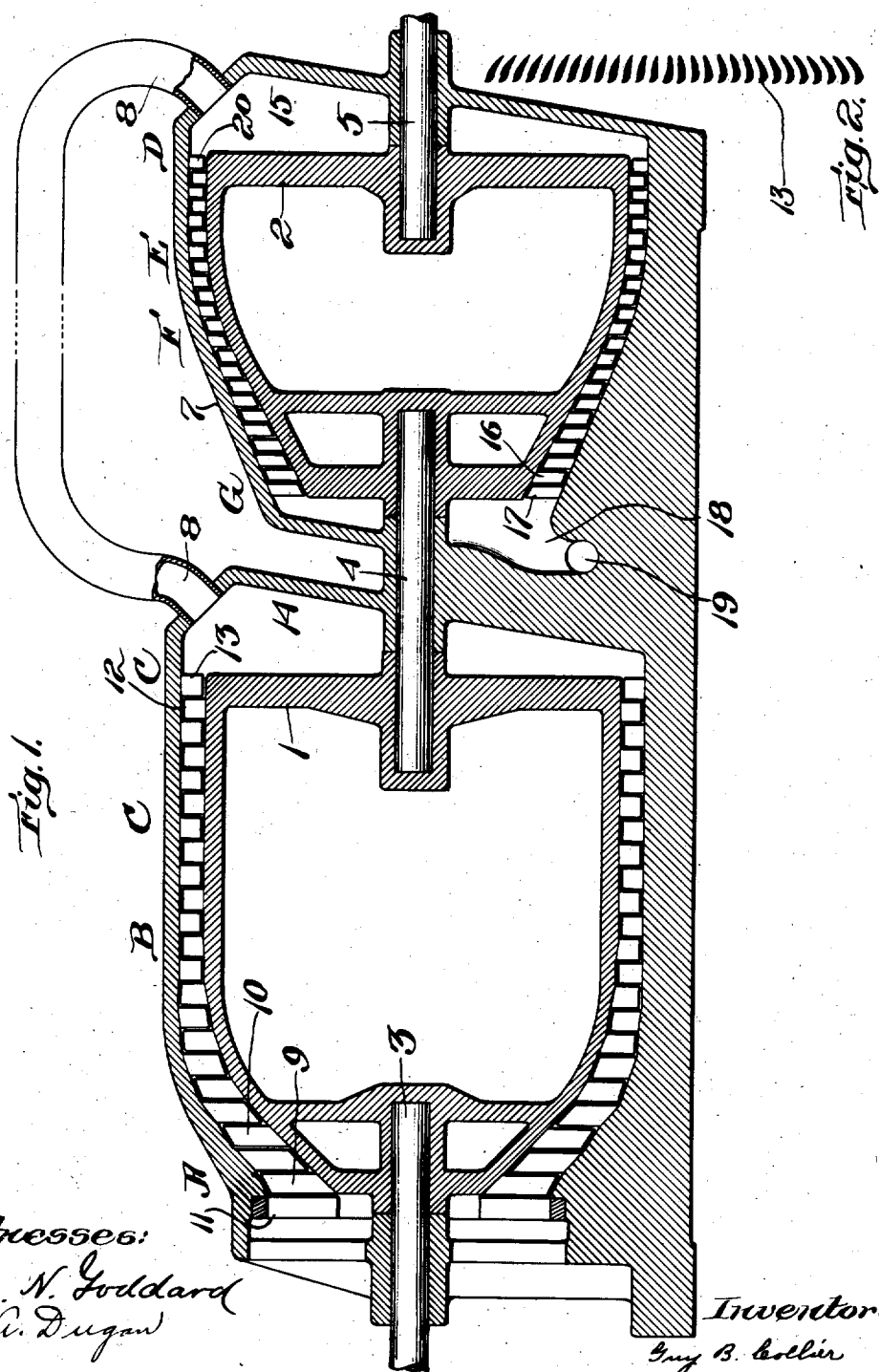

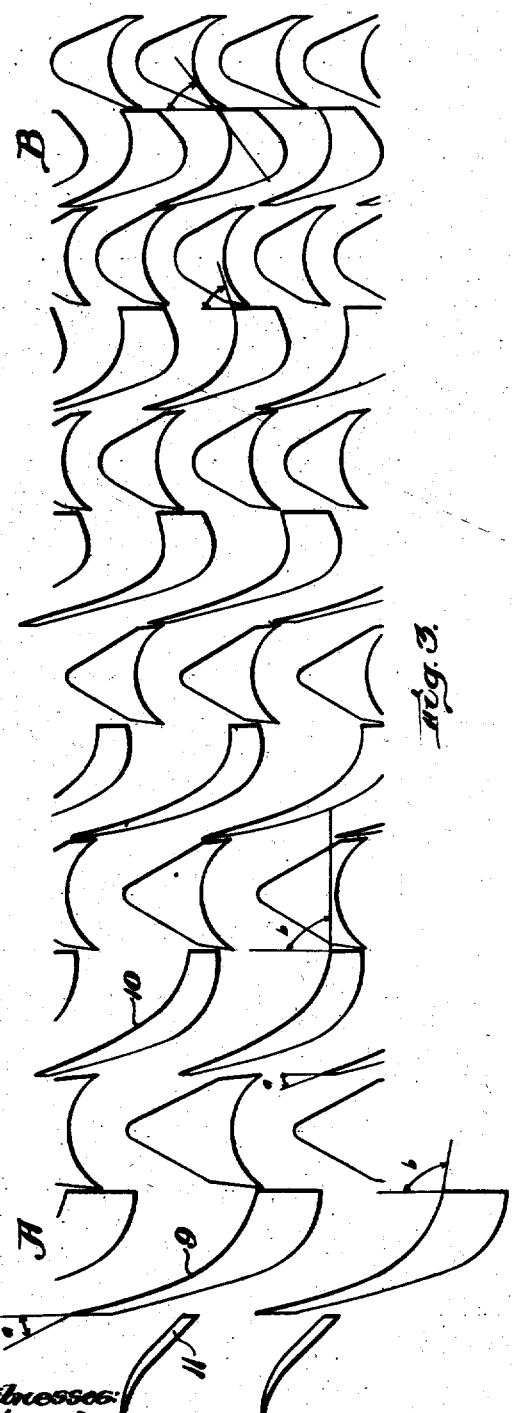
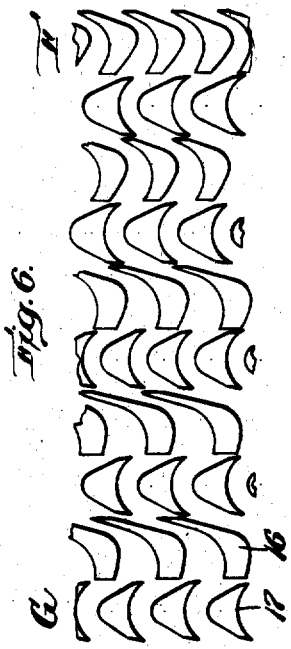
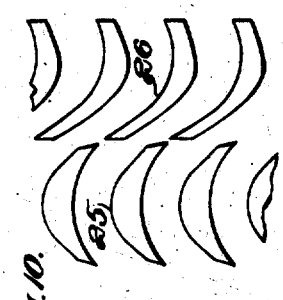
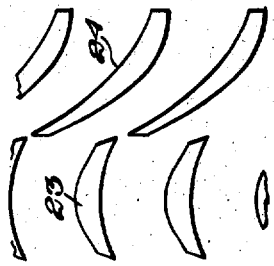

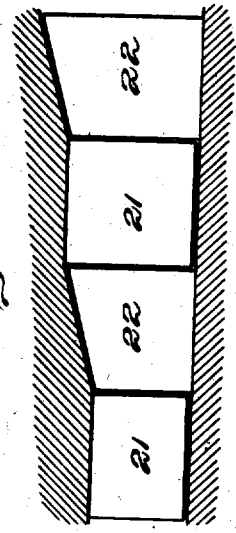
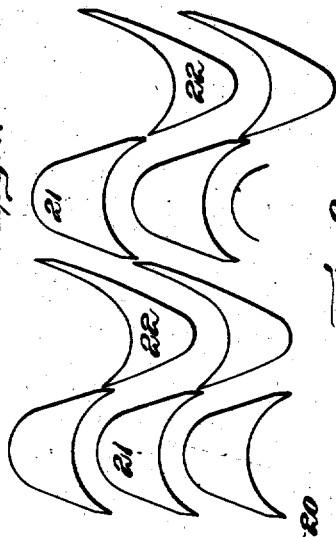
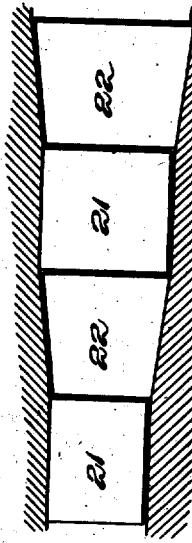
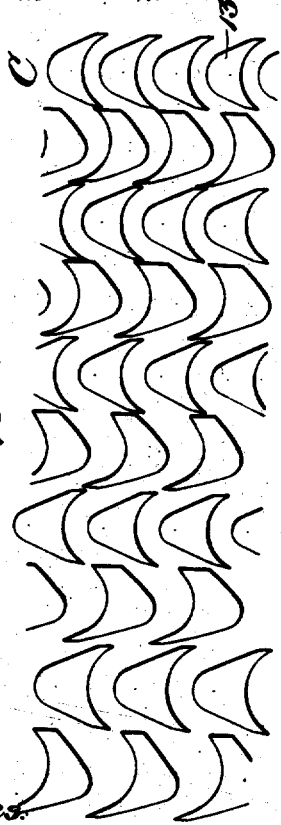

GUY B. COLLIER, OF KINDERHOOK, NEW YORK.

TURBO-PUMP.

No. 901,228.

Specification of Letters Patent.

Patented Oct. 13, 1908.

Application filed January 28, 1907. Serial No. 354,363.

*To all whom it may concern:*

Be it known that I, GUY B. COLLIER, citizen of the United States, and resident of Kinderhook, Columbia county, New York, have invented certain new and useful Improvements in Turbo-Pumps, of which the following is a specification.

The invention relates more especially to turbo-pumps for fluids either gaseous or liquid although certain features may be embodied in steam or other elastic fluid turbine motors.

In practicing the various features of the invention in turbo-pumps the entering fluid is acted upon by rotor blades the velocity of which increases in successive stages up to the highest blade velocity. In passing through the rotor blades of a stage the absolute velocity of the fluid is increased to such a value as will enable the angles of the blades in the succeeding stage to be the most desirable. The fluid in passing from one series of rotor blades to the other passes through stator blades which may be so arranged that some change in velocity, and in the case of a compressor pump some compression, is effected in the guides. It is preferred however to arrange the guides so that substantially no change in velocity or pressure is effected therein since this arrangement of guides enables the rotor blades to be more advantageously arranged and results in a more efficient action. With the stator blades arranged to act merely as guides substantially all change in absolute velocity and in pressure takes place in the rotor blades which is of advantage in that it enables the rotor to be driven at a lower rate of speed and also enables the guides and rotor blades to be arranged at the most desirable angles with relation to each other. By arranging the rotor blades at the entrance end of the pump so that the velocity of the blades increases in successive stages the comparatively slow moving fluid is admitted to the comparatively slow moving blades and the velocity of the fluid is gradually built up so that when the fluid arrives at the point where the blade velocity is the highest the velocity of the fluid may be such as is suitable for the most advantageous arrangement of the blade angles.

In practicing the invention in a turbo-pump for compressing air or other elastic fluid, the fluid after its velocity has been built up in the manner described passes through successive series of rotor and stator blades where it is further compressed while the absolute and axial velocity remains substantially constant in successive stages. In this part of the compressor the blades are preferably arranged in such manner that substantially all the compression takes place in the rotor blades since this enables the most desirable blade angles to be employed and enables the compression to be effected in fewer stages. The blades in this part of the rotor may be arranged so that compression will be effected in both the rotor blades and the stator blades but such an arrangement will require more stages for the same compression and less desirable blade angles. In either case the gradual building up of the velocity of the fluid at the entrance end of the compressor in the manner heretofore explained enables the bringing of the fluid to such a condition as to velocity and pressure when it reaches the point where the blade speed is the highest, that a large amount of work per stage may be performed upon it under the most desirable conditions as to blade angle relations and speed of rotation.

In case it is desired to deliver the fluid from the pump at a comparatively low velocity the rotor is provided at its delivery end with rotor and stator blades arranged to reduce the absolute and axial velocities of the fluid. This result is effected by increasing the cross sectional area of the passages through which the fluid passes in successive stages. In this part of the rotor the speed of the rotor blades decreases in successive stages while the cross sectional area of the passages between the blades in each stage increases from the entrance side of the blade to the exit side, the increase preferably being more pronounced in the guide blades. The absolute and axial velocities of the fluid are thus decreased while in the case of an elastic fluid compression takes place in both the rotor blades and stator blades. The reduction in velocity in the stator blades causes the fluid to enter the succeeding lower speed rotor blades at a speed suitable for the most advantageous arrangement of blade angles.

The various features of the invention will be readily understood from the foregoing and from the following detailed description of a turbo-compressor pump illustrated in the accompanying drawings which embodies all the features of the invention in the form in which I prefer to use them.

In the drawings—Figure 1 is a sectional view illustrating the turbo-compressor; Fig. 2 is a diagrammatic view illustrating the arrangement of the delivery guide blades. Figs. 3 and 4 are views showing the arrangements of the stator and rotor blades from A to C in Fig. 1. Figs. 5 and 6 are views showing the arrangement of stator and rotor blades from D to G in Fig. 1. Figs. 7, 8 and 9 are views showing an arrangement of blades for a steam turbine embodying certain features of the invention; and Fig. 10 is a view showing the arrangement of blades for a liquid pump embodying certain features of the invention.

As illustrated in the drawings the rotor of the compressor comprises two drums 1 and 2 secured to and supported by the shafts 3, 4 and 5. These rotor drums are mounted within casings 6 and 7 which form the stator of the compressor. The drum 2 is in effect a continuation of the drum 1 and may be of the same or a different diameter. The rotor is thus constructed in two sections for the purpose of balancing the end thrust, the thrust upon the rotor blades carried by the drum 2 being in the opposite direction from the thrust upon the rotor blades carried by the drum 1. The compressed fluid is led from the casing 6 to the casing 7 through a pipe 8 and in passing from one casing to the other the fluid may if desired be passed through an intercooler. The casings 6 and 7 may be provided with water jackets in case it is desired to deliver the air at a low temperature.

At the inlet end of the compressor the rotor drum 1 is so constructed that its periphery gradually increases in diameter from the inlet end toward the outlet end and the blades are so proportioned that the mean velocity of the blades increases in successive series. In other words the mean velocity of the first series of rotor blades 9 is less than the mean velocity of the succeeding series of rotor blades 10 and the velocity of the blades progressively increases in the successive stages for a certain distance which will vary according to the results which it is desired to accomplish. The casing 6 is provided with entrance guide blades 11 arranged to admit the fluid to the rotor blades 9 at a favorable angle and without shock upon the first series of blades.

In the construction shown the rotor blade speed in successive stages increases from A to B. The comparatively slow moving air is admitted to the blades 9 which have the lowest velocity and as the fluid passes from A to B the fluid is compressed and the absolute velocity of the air is increased to the value desired where the blade speed is the highest. To accomplish this the axial clear cross-sectional area (i. e. the area in a plane at right angles to the axis) of the passages through the rotor blades in each stage varies from the inlet to the exit side of the blades and since in this part of the compressor the axial velocity at the outlet should be greater than it is at the inlet side of the blades, this cross-sectional area is less at the outlet than it is at the inlet side of the blades as indicated in Fig. 3. Compression and change in velocity therefore takes place in the rotor blades. The sectional area of the passages through the stator blade at right angles to the direction of the flow through the passages in each stage may be varied from inlet to exit so that the velocity of the fluid passing through the guide blades will be reduced to some extent and some compression be effected in the guide blades. It is preferred however to make the cross-sectional area of the passages through the guide blades at right angles to the direction of the flow through said passages in each stage substantially uniform from inlet to exit as indicated in Figs. 1 and 3 so that substantially all the compression and change in velocity is effected in the moving rotor blades and this arrangement of stator and rotor blades forms one of the features of the invention. This arrangement enables the use of the most desirable blade angles and angles which will enable a large amount of work to be performed per stage thus reducing the number of stages required.

The variation in the axial clear cross-sectional area through the rotor blades may be provided for in any suitable manner but I prefer to effect the variation by a change in the radial depth of the passages as indicated in Fig. 1 of the drawing and also by change in the distance between the faces of adjacent blades as indicated in Figs. 3 to 6.

With the inlet end of the compressor constructed as above described little change in the inlet angles $a$ of the blades is required from A to B while the outlet angles $b$ of the blades should be decreased by suitable amounts as indicated in Fig. 3 to secure the best results. If the inlet angles are changed they should be decreased in successive stages, or in other words, the inlet angles should be substantially the same in successive stages or should decrease. The inlet and outlet angles of the guide blades should also be decreased by suitable amounts at proper stages in order to secure the greatest amount of work upon the fluid in each stage.

With the inlet end of the compressor constructed and arranged as above described the fluid when it reaches the highest rotor blade speed at B is in such a state that a large amount of work per stage may be performed upon it under the most desirable conditions as to blade angles and with a moderately low speed of rotation. In the compressor shown the rotor blade speeds from B to C are constant and the rotor blades are so arranged that compression takes place in these blades as indicated in Figs. 3 and 4. The guide blades on the casing may be so arranged that a certain amount of compression is also effected in the guides. It is preferred however to employ in this part of the compressor the feature already referred to, namely the feature of effecting substantially all the compression in the moving blades. In such case the guide blades may be arranged as indicated in Figs. 3 and 4 so that the cross-sectional area at right angles to the direction of flow between adjacent blades is substantially constant. From B to C the axial clear cross-sectional area of the rotor blade passages in each stage varies from the inlet to the outlet side of the blades and in case the axial velocity is to be the same at the inlet and outlet side of the blades as is most desirable, then the axial clear cross-sectional area should be less at the outlet than it is at the inlet side of the blades. The decrease in axial clear cross-sectional area may be effected by varying the radial depth of the blades or by properly shaping the blades as indicated in Figs. 3 and 4. The arrangement and construction of the blades from B to C is such that the fluid is compressed while the absolute velocity remains substantially the same at successive stages.

The fluid discharged from the last series of rotor blades 12 is directed by a series of delivery guide blades 13 to a chamber 14 from which it passes through the pipe 8 to a chamber 15 within the casing 7. That part of the compressor between the points D and E is substantially a continuation of the part from B to C and the blades on the rotor and casing are preferably arranged in the manner described in connection with the part B to C and indicated in Fig. 5. From E to F the mean blade speed in successive stages decreases somewhat. In this part of the compressor the absolute and axial velocities of the fluid are decreased somewhat and the rotor and guide blades are preferably so arranged that part of the compression takes place in the guides and a part in the rotor blades. The reduction of the velocity in the guide blades causes the fluid to enter the lower speed rotor blades at the proper value for the use of desirable blade angles. At E nearly the required amount of compression has been effected and from E to G the velocity of the fluid is reduced in order to give a lower rate of discharge from the compressor.

From F to G there is a progressive reduction in the rotor blade speeds in successive stages and there is also a progressive increase in the cross sectional area of the blade passages both in each stage and in successive stages. The blades are so arranged and constructed from F to G that compression is effected in both the rotor blades and guide blades. This is accomplished by so designing the blades that the cross sectional area of the passages between the blades of each stage both on the rotor and on the casing increase from the entrance to the outlet side of the blades. Compression is therefore effected in both the blades and the guides while the velocity is decreased. By also decreasing the blade velocity in successive stages the fluid is delivered to each series of rotor blades at such a velocity with relation to the velocity of the blades as to enable the use of the most desirable and efficient blade angles.

The amount of increase in the cross sectional area of the blade passages from F to G depends upon the results which it is desired to accomplish. The larger the reduction in velocity desired the greater the increase of the cross sectional area of the blade passages. This increase in cross sectional area may be effected in any desired manner but is preferably effected by lengthening the blades and guides radially in the manner indicated in Fig. 1 and also varying the distance between adjacent blade surfaces as indicated in Fig. 6. The distribution of the rotor blades and consequently of the stages between the drums 1 and 2 should be so proportioned that the end thrust due to the action of the fluid upon the blades of one drum will counterbalance the end thrust due to the action of the fluid upon the blades of the other drum.

The fluid discharged from the last series of blades 16 on the drum 2 is directed by guide blades 17 into a chamber 18 from which it is delivered through a discharge outlet 19.

The guide blades 13 and 17 are preferably so arranged on the two sides of the diametrical lines through the outlets 8 and 19 that the fluid from the blades on opposite sides of this line will be delivered in the general direction of the outlet. In other words while the delivery guide blades have uniform entrance angles their exit or outlet angles vary in such manner as to deliver the fluid in the general direction of the outlet. This arrangement of the delivery guide blades is diagrammatically illustrated in Fig. 2 which indicates a development of the circular series of blades.

The entrance angles of the guide blades 11 at the inlet end of the drum 1 and the entrance angles of the guide blades 20 at the inlet end of the drum 2 may be arranged in a similar manner to the arrangement of the delivery guide blades in cases where the incoming fluid is delivered through an inlet arranged at one side of the rotor as is the pipe 8.

While I have described my invention as applied to a turbo-compressor certain features and more especially those relating to the arrangement of the rotor and stator blades in such manner that substantially all changes in pressure and velocity take place in the moving rotor blades, may be embodied with advantage in turbine motors. In such case the axial clear cross sectional area of the passages between the rotor blades of each stage should vary from the inlet to the outlet sides of the blades, while the cross sectional area of the passages between the stationary blades at right angles to the direction of flow in a stage should be substantially uniform.

In case the axial velocity is to be the same at the inlet and outlet sides of the vanes as is most desirable, then the axial clear cross-sectional area should be greater at the outlet than it is at the inlet side of the vanes.

In Figs. 7, 8 and 9 an arrangement of blades is shown which is well suited for use in a turbine motor. As here shown the stator blades 21 are so arranged that the cross-sectional area at right angles to the direction of flow between adjacent blades is substantially constant, while the rotor blades 22 are so arranged that the axial clear cross-sectional areas of the passages between adjacent rotor blades is greater at the exit than it is at the entrance side of the blades. In this case the increase in the passage area in successive stages required by reason of the expansion of the steam may be provided for by varying the length of the rotor blades from side to side in each stage as indicated in Fig. 8 or as indicated in Fig. 9 or may be provided for in any other suitable manner. If provided for in either of the ways shown the variation in the perpendicular distance between the adjacent blade surfaces should be such that the axial clear cross sectional area of the passage between the blades is greater at the exit than at the entrance side of the blades.

Substantially the construction above described may be employed as a turbo-pump for acting upon water or other liquids, the angles of the blades being modified to suit the conditions under which the construction is to be used. In this case the absolute velocity of the water or other liquid will be increased in the rotor blades and will remain substantially constant through the following guide blades. From A—B the velocity will be built up as in the case of the compressor, the liquid being taken in where the blade velocity is comparatively low and the velocity being built up in the successive stages to the point where the blade velocity is the greatest. From C to D and D to E the blades will be so constructed that the velocity of the liquid is increased. In case a moderate velocity of discharge is desired the increase in the cross sectional area of the blade passages from E to F will be moderate.

When it is desired to force the liquid forward against a high pressure the increase in the cross sectional area of the blade passages is made large enough to reduce the velocity gradually and consequently produce a high pressure to cause the forward flow of the liquid.

An arrangement and form of blade suitable for a liquid pump is indicated in Fig. 10. As here shown the guide blades and rotor blades at one stage from B to C say at B, are shown at 23 and 24, while the blades at a later stage say at C, are shown at 25 and 26.

Without attempting to point out in detail the various forms and constructions in which the invention may be embodied, what I claim is:—

1. A turbo-pump provided at its inlet end with radially extending rotor and stator blades arranged in successive series axially, the rotor blades being so arranged that the axial clear cross sectional area between the blades in each stage varies and the outlet angles decrease in successive stages to progressively increase the velocity and pressure of the entering fluid in the successive stages, substantially as described.

2. A turbo-pump provided at its inlet end with radially extending stator blades and intermediate radially extending rotor blades arranged in successive series axially and at progressively increasing radial distances from the axis of the rotor, and with non-increasing inlet and decreasing outlet rotor blade angles in its successive stages, substantially as described.

3. A turbo pump comprising a rotor having at its inlet end a periphery of increasing diameter, radial blades on the rotor arranged in successive series axially and with non-increasing inlet and decreasing outlet blade angles in successive series, and a stator provided with intermediate series of blades, substantially as described.

4. A turbo-pump provided at its inlet end with series of rotor blades having increasing velocities in successive stages, the blades in each stage being so arranged that the passages between adjacent blades decrease in axial clear cross sectional area from entrance to exit, and a stator provided with intermediate blades, the blades in each stage being so arranged that the passage between adjacent blades is substantially uniform in cross sectional area at right angles to the flow, substantially as described.

5. A turbo-pump provided at its inlet end with series of rotor blades having increasing velocities in the successive stages, and series of rotor blades having uniform velocity in successive stages, substantially as described.

6. A turbo-pump provided at its inlet end with series of rotor blades having increasing velocities in successive stages, the blades in each stage being so arranged that the passages between adjacent blades decrease in axial clear cross-sectional area from entrance to exit, a stator provided with intermediate blades, the blades in each stage being so arranged that the passage between adjacent blades is substantially uniform in cross sectional area at right angles to the flow, series of rotor blades having uniform velocity in successive stages, and intermediate stator blades, substantially as described.

7. A turbo-pump provided at its inlet end with series of rotor blades having increasing velocities in successive stages, series of rotor blades having uniform velocity in successive stages, the blades in each stage being so arranged that the passages between adjacent blades decrease in axial clear cross sectional area from entrance to exit, and a stator provided with guide blades intermediate the rotor blades, the blades in each stage being so arranged that the passage between adjacent blades is substantially uniform in cross sectional area at right angles to the flow, substantially as described.

8. A turbo pump provided at its delivery end with successive series of rotor and stator blades arranged with progressively increasing axial clear area in successive stages to progressively increase the pressure and decrease the velocity of the fluid passing through the blades, substantially as described.

9. A turbo-pump provided at its delivery end with series of rotor blades arranged at decreasing distances from the axis of the rotor and with increasing area for passage of the fluid in the successive series, and series of stator blades intermediate successive series of rotor blades, substantially as described.

10. A turbo-pump provided at its delivery end with series of rotor blades having decreasing velocity in successive stages, series of stator blades intermediate the rotor blades, the blades in each series being so arranged that passage between adjacent blades increases in sectional area from entrance to exit, substantially as described.

11. A turbo-pump provided at its inlet end with series of rotor and stator blades constructed and arranged to progressively increase the velocity of the entering fluid in the successive stages, series of rotor and stator blades constructed and arranged to progressively increase the pressure while maintaining a substantially uniform velocity in the successive stages, and series of rotor and stator blades at the delivery end constructed and arranged to progressively decrease the velocity while increasing the pressure, substantially as described.

12. A turbo pump comprising a rotor provided at its inlet end with radial blades arranged in successive series axially, the successive series being at increasing distances from the axis of the rotor and with the outer ends of the blades at increasing distances from the axis of the rotor, and a stator provided with intermediate series of radial blades, substantially as described.

13. The combination with a rotor provided with series of blades adjacent blades in each series being separated by an intervening passage of varying cross sectional area, of a stator provided with intermediate series of blades, adjacent blades in each series being separated by an intervening passage of substantially uniform cross sectional area whereby substantially all changes in velocity and pressure take place in the rotor blades, substantially as described.

14. The combination with a rotor provided with series of radially extending blades, adjacent blades in each series being separated by an intervening passage of varying cross sectional area, a stator provided with intermediate series of blades adjacent blades in each series being separated by an intervening passage of substantially uniform cross sectional area, whereby substantially all changes in velocity and pressure take place in the rotor blades, substantially as described.

15. A turbo-pump provided with delivery guide blades having uniform entrance angles and varying exit angles arranged to direct the discharging fluid in the same general direction, substantially as described.

16. A turbo-pump provided with delivery guide blades having their outlet surfaces inclined in the same general direction on the two sides of a diametrical line whereby the air delivered from the two sides of said line is delivered in the same general direction, substantially as described.

In witness whereof, I have hereunto set my hand, this 24th day of January 1907.

GUY B. COLLIER.

In the presence of—
IRA L. FISH,
KATHARINE A. DUGAN.